July 12, 1966     H. ZWETZ     3,260,246
REGULATING ARRANGEMENT FOR FORCED FLOW TYPE BOILER
Filed March 10, 1965
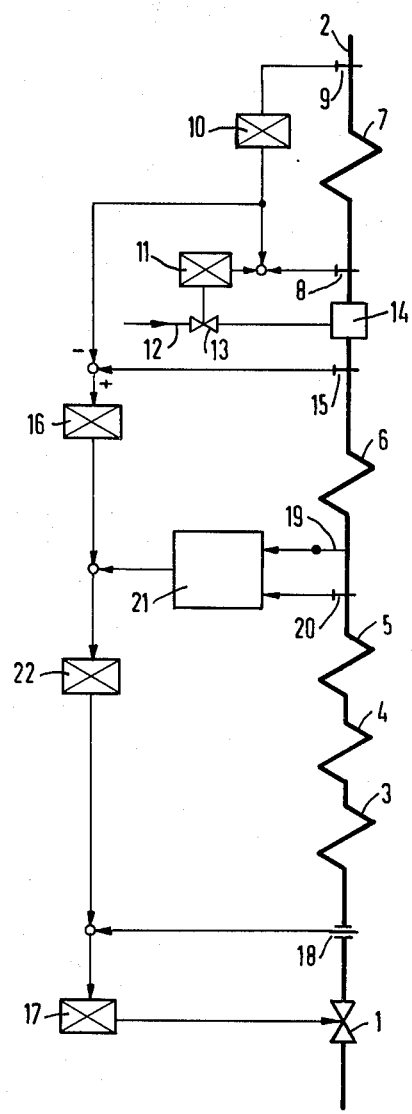

United States Patent Office

3,260,246
Patented July 12, 1966

3,260,246
REGULATING ARRANGEMENT FOR FORCED
FLOW TYPE BOILER
Herbert Zwetz, Erlangen, Germany, assignor to Siemens-Schuckertwerke Aktiengesellschaft, Erlangen, Germany, a corporation of Germany
Filed Mar. 10, 1965, Ser. No. 439,524
Claims priority, application Germany, Mar. 13, 1964
S 89,998
3 Claims. (Cl. 122—451)

My invention relates to the regulation of boilers. More particularly, it relates to the regulation of boilers of the forced flow type in which the feed water is heated, evaporated and superheated in the tube system of the boiler.

Forced flow type boilers as disclosed in U.S. Patents 3,089,308 and 3,134,367 of Kurt Halle and assigned to the assignee of this application are widely used in power plants as steam generators for steam operated electric turbines. In such power plants, it is necessary to provide regulation for maintaining the output of the steam generator, i.e., the boiler, in accordance with the power demand of the steam turbine and vice versa. One known arrangement for providing such regulation is to have the turbine regulator as the master regulator so that the turbine regulator controls both the operation of the turbine and the boiler. Another known arrangement is to produce load-regulating signals simultaneously and in parallel with both the turbine and boiler regulators, a control by electric signals or manual control or control by programming apparatus being applicable for such purposes.

In the regulation of the boiler, the aim is to correlate the heating produced by the boiler and the supply of the working medium, i.e., the water fed thereinto. Stating this in another manner, the object to be accomplished in the boiler regulation is the proper coordination of the supply of fuel and combustion air and the supply of feed water.

For regulating the feed water supply flow quantities, conventional measuring diaphragms may be utilized. In addition, the temperature of the fresh steam issuing from the boiler and the temperature occurring at a point preceding the injection cooler in the boiler, may be regulated. With such arrangement, the temperature differential at the injection point or the percentage injection of water circulation and other quantities occurring in the path the working medium traverses, i.e., fluid flow, are monitored and brought to required values.

The aforedescribed regulation scheme presents the disadvantage that it is highly inertial and results in comparatively slow start-up regulation and consequently there is an unsatisfactorily slow response to rapid and massive load changes. In an attempt to overcome such slow response disadvantage, recourse has been had to the monitoring of auxiliary control parameters which change more rapidly than main control parameters to changes in regulated quantities. An example of such main control parameter is the displacement of feed water control valves in response to changes in flow quantity. An example of an auxiliary control parameter is the temperature change of an "auxiliary heating surface" wherein the temperature change of the water therein rapidly responds to changes in heating conditions.

While the employment of the temperature changes in the auxiliary heating surface enables the effecting of a more rapidly responsive control, a disadvantage presented in such employment is the need to highly amplify in such auxiliary heating surface, the temperatures measured in the preheater in the operation of the main control system. A further disadvantage flowing from such employment is the great dependence thereof on pressure which, in load changes, may lead to undesirable displacements in valves, etc.

Accordingly, an important object of this invention is to provide means in a regulating system for a boiler for effecting proper correlation between heating and working medium flow.

It is another object to provide means in accordance with the preceding object wherein the correlating means effects such correlation irrespective of pressure.

In accordance with the invention, the enthalpy of the steam as it emerges from the pre-superheater in the boiler is utilized as an auxiliary control parameter in the boiler regulating system. Thus, with the maintaining of a substantially constant temperature of the feed water, the enthalpy of the weakly superheated steam at its emergence point from the pre-superheater, irrespective of the pressure, provides a continuous measure of the correct correlation of heating and working medium flow. Changes in the enthalpy which result from load changes, fluctuations caused by changes in fuel quantities and characteristics, the effects of tube soilage, etc., are taken into account in the operation of the main boiler regulating system, such changes varying the datum value of the enthalpy.

To utilize the enthalpy of the weakly superheated steam as an auxiliary control parameter, there are sensed both the pressure and temperature values which occur in the section of the boiler between the pre-superheater and the superheater. These values are applied to an enthalpy computer which may suitably be either of the analog or digital type wherein the enthalpy is continually calculated to provide a steady output from the computer which represents the calculated enthalpy at the aforesaid section.

According to the invention, there is provided in a regulating system for a boiler of the forced flow type wherein the boiler comprises feed valves for supplying feed water to the boiler, a preheating stage for heating the feed water to steam and for slightly superheating such steam, a superheating stage for superheating the slightly superheated steam and an intermediate section between the preheating and superheating stages, and wherein the regulating system includes means for monitoring the quantity of feed water flow in the preheating stage, means for monitoring the temperature of the steam output of the boiler and means for regulating the quantity of feed water input and temperature of the steam output in response to the values of the monitored entities; the improvement which comprises means for providing an auxiliary control entity representative of the enthalpy of the aforesaid slightly superheated steam to enable the effecting of an auxiliary control of the quantity of feed water. The last named means comprises means for continually monitoring the pressure and temperature of the slightly superheated steam at the intermediate section to steadily derive respect values therefrom for continually calculating the enthalpy of the slightly superheated steam, and means responsive to the calculated enthalpy values for effecting an auxiliary control of the feed water input.

The above mentioned and more specific objects and features of my invention will be apparent from and will be mentioned in the following description of a regulating device according to the invention shown by way of example in the accompanying drawing in which the sole figure illustrates schematically an embodiment in straight-line representation.

Referring now to the drawing wherein there is shown a circuit diagram of a boiler equipped with the heater working medium supply correlating means, the feed water is supplied to the boiler through main feed valves 1 and passes through the boiler to emerge as fresh superheated steam from outlet 2. In such passing through, the feed water goes through a water quantity responsive gauge or measuring diaphragm 18 which may suitably be of the type which provides an electric signal in accordance with the measured quantity, a high pressure preheater or economizer 3, an evaporator 4 and a pre-superheater 5. From pre-superheater 5, the working medium goes through a superheater 6, a superheater 7 and thence through outlet 2 as fresh steam.

In the regulating system of the boiler, the temperature of the fresh steam is regulated by monitoring the temperature at points 8 and 9 respectively proximal and distal to superheater 7, the temperature data being obtained thereby being utilized to influence the operation of the fresh steam temperature regulator 10 and the injection regulator 11. The injection regulator 11 controls spray valve 13 to control the amount of injection water which flows through injection line 12 through spray valve 13 and into injection point 14.

The temperature is also measured at an injection point 15 and the information obtained thereby is fed to a temperature difference regulator 16 which operates in response to such information and the output of fresh steam temperature regulator 10.

Structure 17 represents a feed water regulator for controlling the displacement of feed water valve 1, feed water regulator 17 operating in response to the outputs of fresh steam temperature regulator 10, temperature difference regulator 16 and the information output from diaphragm 18.

As is shown in the aforementioned U.S. Patent 3,134,367 to Kurt Halle, the temperature measurements in the auxiliary heating surface in the pre-superheater are utilized as the auxiliary control parameters or entities to enable improved response of the regulating system but with its attendant disadvantages of the requirement of high amplification in the auxiliary control circuit and the heavy dependence upon pressure which may lead to undesirable displacements of the feed water valves.

According to the invention, both the pressure values occurring at point 19 as well as the temperature values at point 20 are sensed in the section between the pre-superheater 5 and the superheater 6. Representation of these sensed values are applied as an input to a computing device 21 which may suitably be a digital or analog computer. In computing device 21, the enthalpy of the slightly superheated steam at the section intermediate the preheater 5 and the superheater 6 is continually calculated and representations of these computed values are steadily applied to an enthalpy regulator 22. The output of enthalpy regulator 22 is applied as an input to feed water regulator 17, such output consequently functioning as an auxiliary control of the displacement of feed water valves 1.

From the foregoing, it is seen that whereas, up to now, temperature measurements in the superheater have been utilized as parameters for enabling an auxiliary control entity, in accordance with the invention, both the pressure and temperature values of the slightly superheated steam in the intermediate section are utilized as parameters and the enthalpy of the slightly superheated steam calculated from these last named parameters provides an auxiliary control entity which is always a measure of the correct correlation of heating and working medium flow.

It will be obvious to those skilled in the art, upon studying this disclosure, that regulating arrangements according to my invention permit of a great variety of modifications and hence can be given embodiments other than that particularly illustrated and described herein, without departing from the essential features of my invention and within the scope of the claims annexed hereto.

I claim:
1. In a regulating system for a boiler of the forced flow type wherein said boiler comprises feed valves for supplying feed water to said boiler, a preheating stage for heating said water to steam and for slightly superheating said steam, a superheating stage for superheating said slightly superheated steam and an intermediate section between said preheating and superheating stages and wherein said regulating system includes means for monitoring the quantity of water flow in said preheating stage, the temperature of the steam produced from said superheating stage; means for regulating the feed water input and means for regulating the temperature of the output steam in response to the values of the monitored entities; means for continually monitoring the pressure and temperature of said slightly superheated steam at said intermediate section to derive respective values therefrom for continually calculating the enthalpy of said slightly superheated steam, and means responsive to said calculated enthalpy values for effecting an auxiliary control of said feed water input.

2. In a regulating system as defined in claim 1 wherein there are further included computer means having an input to which the values of said pressure and temperature measured at said intermediate section are fed and an output for providing said calculated superheated steam enthalpy values as an input to said auxiliary control means.

3. In a regulating system as defined in claim 2 wherein the output of said auxiliary control means is applied as an input to said means for regulating the feed water input.

References Cited by the Examiner
UNITED STATES PATENTS

| | | | |
|---|---|---|---|
| 3,086,504 | 4/1963 | Profos | 122—451 |
| 3,089,308 | 5/1963 | Halle | 60—106 |
| 3,164,135 | 1/1965 | Von Beck | 122—451 |

KENNETH W. SPRAGUE, *Primary Examiner.*